United States Patent [19]

Schlosser et al.

[11] 4,034,182
[45] July 5, 1977

[54] METHOD OF FABRICATING RINGS FROM SEPARATE SEGMENTS AND FIXTURE FOR USE THEREWITH

[75] Inventors: Werner Schlosser, Munich; Horst Berger, Lochham, both of Germany

[73] Assignee: Motoren- und Turbinen-Union Munchen GmbH, Munich, Germany

[22] Filed: Dec. 17, 1974

[21] Appl. No.: 533,587

[30] Foreign Application Priority Data

Dec. 21, 1973  Germany .......................... 2363722

[52] U.S. Cl. .................... 219/121 EM; 29/156.8 R
[51] Int. Cl.² ......................................... B23K 15/00
[58] Field of Search ............. 219/121 EB, 121 EM; 29/23, 156.8 R

[56] References Cited

UNITED STATES PATENTS

| | | | |
|---|---|---|---|
| 2,345,918 | 4/1944 | Dahlstrand | 29/156.8 R |
| 2,392,281 | 1/1946 | Allen | 29/156.8 R |
| 2,450,493 | 10/1948 | Strub | 29/156.8 R X |
| 2,454,580 | 11/1948 | Thielemann | 29/156.8 R |
| 2,579,583 | 12/1951 | Johnson | 29/156.8 R |
| 3,609,841 | 10/1971 | Telfer et al. | 219/121 EB X |
| 3,617,685 | 11/1971 | Edwards et al. | 219/121 EB |
| 3,705,971 | 12/1972 | Jacovides et al. | 219/121 EM |

FOREIGN PATENTS OR APPLICATIONS

| | | | |
|---|---|---|---|
| 7,046,313 | 3/1970 | France | 219/121 EM |
| 1,338,837 | 2/1961 | France | 219/121 EB |
| 995,813 | 12/1951 | France | 29/156.8 R |

OTHER PUBLICATIONS

J. Lyman, Ed., *Metals Handbook*, 8th ed., vol. 6, 1971, pp. 540, 550, 551.

Primary Examiner—J. V. Truhe
Assistant Examiner—Clifford C. Shaw
Attorney, Agent, or Firm—Alan H. Levine

[57] ABSTRACT

Separate segments, oversized to allow for shrinkage during welding, are assembled in the shape of a ring. The segments may be plates carrying the guide vanes. The assembled ring is placed in a vacuum chamber and the joints between segments welded by an electron beam. The welding may be carried out in two steps, namely, first tack welding the segments together followed by finish welding the entire length of each joint. The segments may be held during welding in a fixture comprising a circular array of radially-slidable jaw elements which carry the separate segments. A clamping ring urges the jaw elements, and hence the segments, radially inwardly, and a cover plate engages the separate segments and urges them radially inwardly so as to clamp the segments together in a ring shape.

7 Claims, 12 Drawing Figures

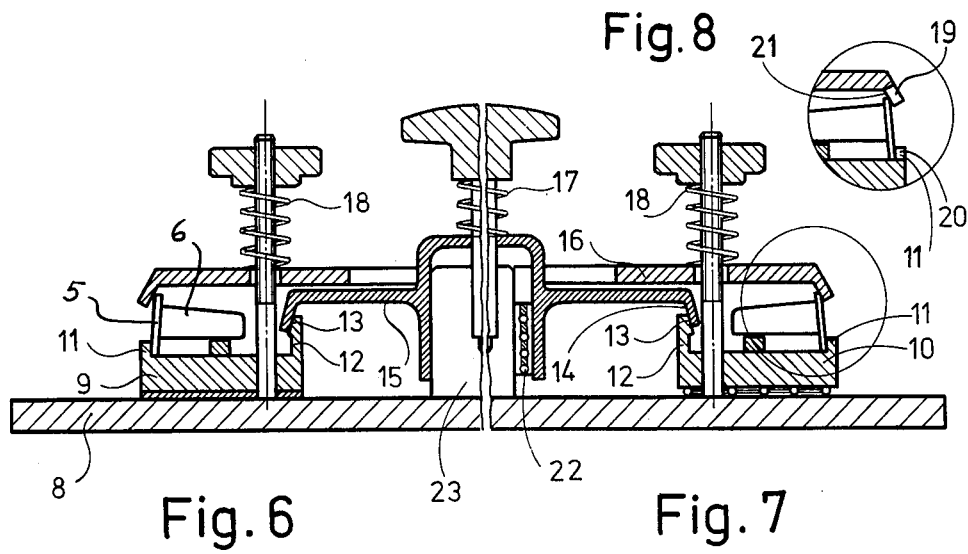
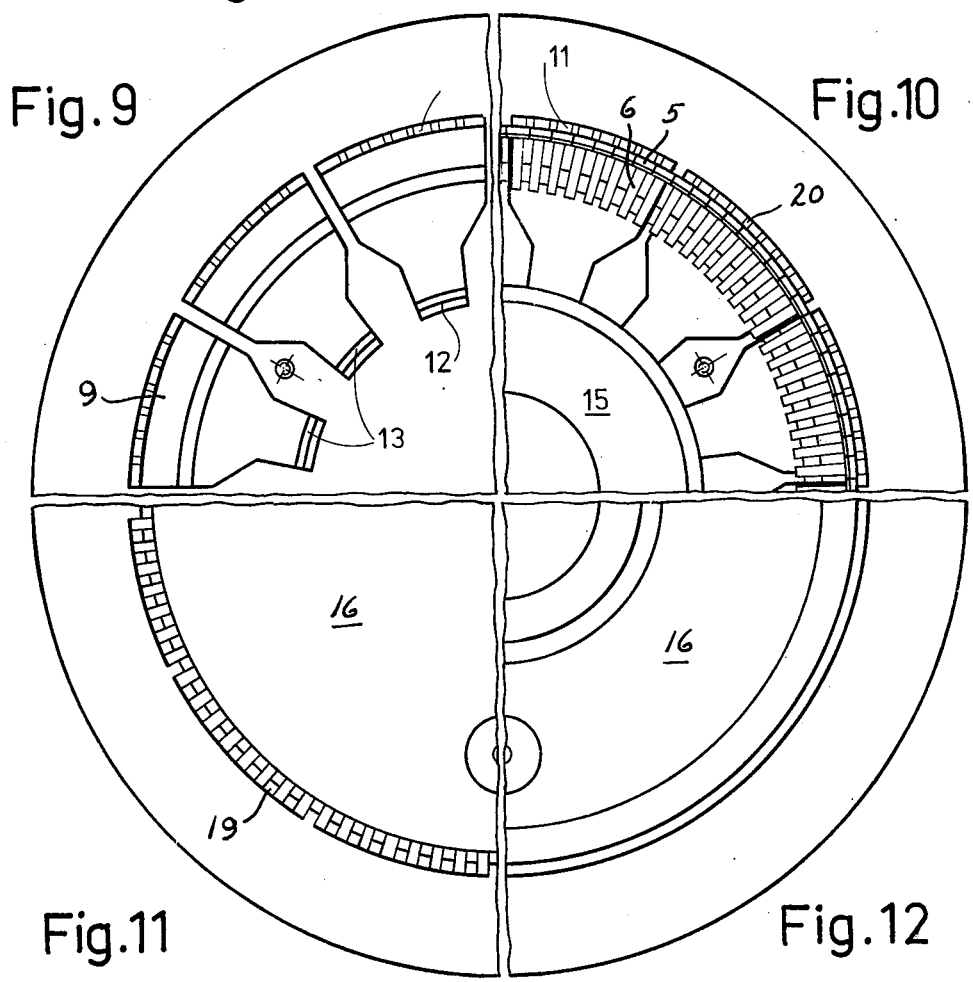

METHOD OF FABRICATING RINGS FROM SEPARATE SEGMENTS AND FIXTURE FOR USE THEREWITH

This invention relates to methods and apparatus for fabricating closely-toleranced rings, and more particularly the invention relates to methods and apparatus for fabricating rows of guide vanes, by welding together a plurality of suitably fasioned separate segments with the aid of electron beam welding.

Heretofore a method has been known for fabricating closely-toleranced rings from separate segments by collecting the segments into a number of groups and joining the members of each group together by electron beam welding in an evacuated chamber. After welding, the groups are then gauged, reworked, again collected into larger groups, placed in the vacuum chamber and welded together. This procedure is repeated until the ring is complete. This method has enabled, e.g., rows of compressor guide vanes to be fabricated from more than 100 plate segments, each carrying a guide vane. The disadvantage inherent in this method has been that fabrication of such a stator ring necessitates the repeated use and evacuation of the vacuum chamber and the attendant great expense of the entire method.

Another consideration is that when the repetitive steps of this procedure are limited to an economically acceptable number, this is often achieved only at the expense of the intended accuracy in manufacture, causing waste and with it, poor economy.

A broad object of this invention is to provide a method which gives greater economy than does the method known heretofore and which, more particularly, avoids the great expense of repeated loading in the vacuum chamber and repeated evacuation while still ensuring the requisite degree of accuracy in manufacture and great consistency of results without intolerable rejection rates.

It is a particular object of the present invention to provide a method by which all the plate segments for a ring are manufactured with an allowance for shrinkage in welding, are disposed in annular arrangement, are clamped one against the other, and are joined one to the other by welding when loaded in the vacuum chamber.

This method makes it possible to escape the disadvantages in the state of the art known heretofore and, more particularly, it avoids the costly repetitive loading of grouped segments in the welding chamber, and it gives greater accuracy in shape and more reliably achieved dimensions within the intended close tolerances than will the method known heretofore.

It is a further object of this invention to provide such a method involving welding in two steps, namely, tack welding followed by finish welding. This prevents inadvertent changes in relative position during finish welding which might impair the manufacturing accuracy.

According to a further feature of this invention the welding beam is guided over the weld joint by electronic means, which makes for faster welding rates. Also, once the initial settings have been made, this method is easy to follow, and it can be repeated at a fast rate.

According to a further feature of the present invention the change-over of the electron beam from one joint to the next is achieved by rotating the welding fixture, which because of the structure of the fixture needed for other reasons, is a simpler expedient than deflecting the electron beam.

According to a further feature of the present invention the sequence of welding the various joints, when tack welding is selected is such that when one tack weld has been completed the fixture is rotated through an angle which places the adjacent joint under the beam. This makes tack welding particularly economical.

According to a further feature of this invention the sequence of welding the various joints, when finish welding is selected is such that when one finish weld has been completed, the fixture is rotated through 180° for welding a diametrically opposite joint next. This spreads the shrinkage more uniformly over the ring and improves the manufacturing accuracy.

To implement the method, use is made of a fixture for holding the plate segments, the fixture having a plurality of jaw segments which are arranged in a circle on a base plate for radial sliding movement in a single plane. The jaw segments have at their radially outer ends, a locating rim sized in accordance with the diameter of the ring, and have at their inner ends, a vertical leg serving to uniformly draw the jaw segments inwards with the aid of a suitable clamping ring having a tapered inner face. The fixture is further provided with a cover plate having a tapered inner face at its outer edge and a central hole for sliding movement over a guide rod, the locating rims of the jaw segments and the tapered inner face of the cover plate uniformly urging the separate ring segments radially inwards, constraining them to take the form of a ring and clamping them one against the other.

This fixture serves to rapidly arrange and retain in their relative position all ring segments needed to form a ring, and it permits the ring segments to be safely clamped one against the other in front and to be advanced during welding as necessary to make up for shrinkage. It further ensures faithful preservation of the annular form before and during welding.

According to a further feature of this invention the fixture is provided with slots cut into the rim of the cover and into each locating rim, the slots being disposed such that the electron beam can readily cover the entire length of a joint, so that the joints between the ring segments can be welded over their full length.

According to a further feature of the present invention, surface ball bearings are arranged between the jaw segments to minimize friction between the jaw segments and the base plate and to assist the radial follow-up movements of the jaw segments.

According to a still further feature of the present invention the fixture is provided with an annular surface ball bearing arranged between the central guide hole in the cover and the guide rod to assist the follow-up movements of the cover and thus improve manufacturing accuracy.

The accompanying drawings illustrate rings and a fixture produced and used, respectively, by means of the method of this invention, in which.

Figure 4:
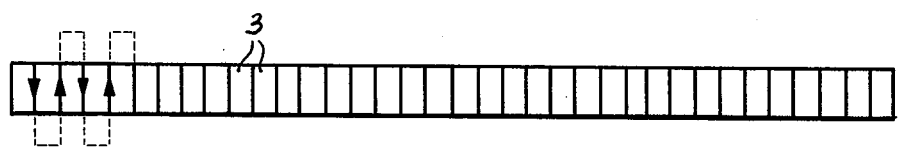
Figure 5:
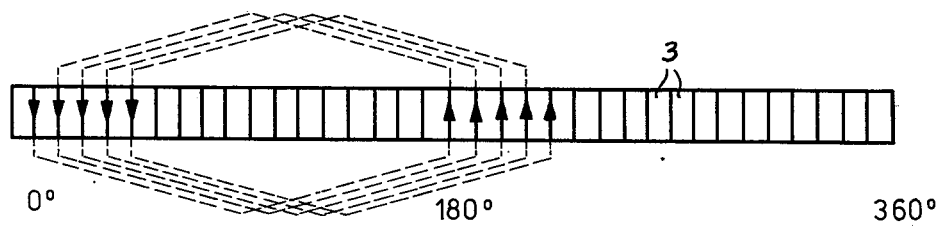

FIG. 4 diagrammatically illustrates a sequence of tack welding;

FIG. 5 diagrammatically illustrates a sequence of finish welding;

FIG. 6 is a cross-sectional view illustrating the left-hand half of a fixture for manufacturing a ring by means of the method of this invention using plain bearings;

FIG. 7 is a cross-sectional view illustrating the right-hand half of the fixture shown in FIG. 6, but with roller bearings;

FIG. 8 is a detail view of a portion of FIG. 7 illustrating the retaining means for vanes, this retaining means having slots;

FIG. 9 is a top view illustrating a sector of a base plate having plate segments (slotted design);

FIG. 10 is a top view illustrating a sector as shown in FIG. 9, having vanes and a clamping ring in position;

FIG. 11 is a top view illustrating a sector as shown in FIG. 9, having a cover plate in position with slots; and FIG. 12 is a top view illustrating a sector as shown in FIG. 11, but without slots.

Figure 2:
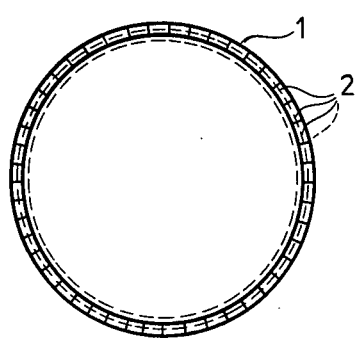
FIG. 2 is a plan view of a ring composed of plate segments, before and after welding (the latter being shown in broken lines)

With reference now to the drawings, a ring 1 to be fabricated in accordance with the concept of this invention is completely assembled from separate segments 2 having a sufficient allowance of extra material on their welding edges to compensate for shrinkage. This makes the ring, before welding, considerably oversized. The ring is then introduced into the vacuum chamber of an electron beam welding machine and the separate segments are welded one to the other, with the amount of shrinkage, anticipated by the allowance of extra material, occurring in every joint. After welding and cooling, the ring will have the intended diameter. Such a ring, composed of simple plates 2, is shown in FIG. 2 before and after welding (the latter condition is indicated in broken lines).

Figure 3:
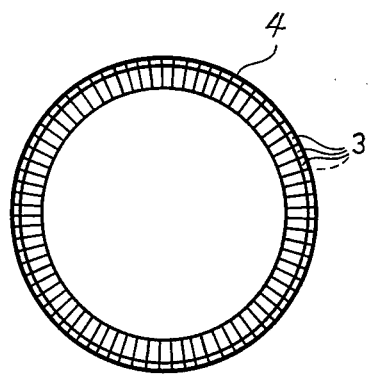
FIG. 3 is a plan view of a row of guide vanes fabricated in accordance with the method of this invention.
Figure 1:
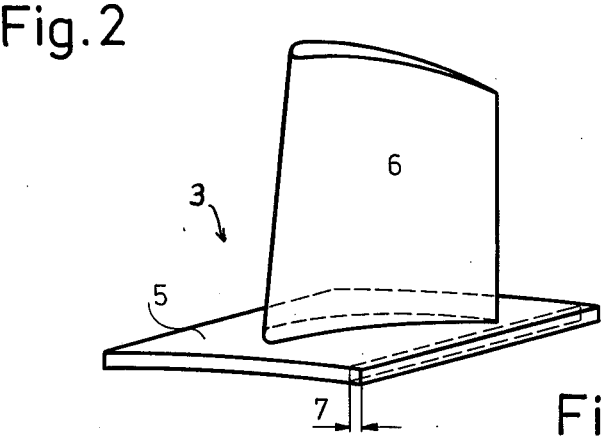
FIG. 1 is a perspective view of a plate segment and vane.

A compressor stator ring 4, also fabricated from separate segments 3, is essentially manufactured in the same manner, except that the place of the separate segments 2 is taken by platforms 5 unitarily connected with compressor stator vanes 6. The platforms have extra material 7 allowed at the welding edges to make up for shrinkage in welding (FIGS. 1 and 3). In electron beam welding, it has been found useful to tack weld the vanes in a first operation before finish welding them in a second operation. It has also been shown that the sequence of welding should best not be random. The drawings illustrate the welding sequence for tack welding (FIG. 4) and finish welding (FIG. 5) a ring composed of 36 separate segments. For tack welding it is acceptable for the joints to be welded successively with the weld operator proceeding from one joint to the next in only one circumferential direction and, for simplicity, making his passes alternately forwards and backwards. For finish welding, however, this procedure is not adequate, and the operator should proceed crosswise, whereby after welding one joint the beam is shifted to a joint 180° away, or alternatively that joint is moved into the beam. This is best achieved by rotating the fixture. In tack welding, too, the changeover from one joint to the next is achieved most simply by rotating the fixture.

A useful fixture for clamping, e.g., compressor stator vane segments to form a compressor stator ring is also shown in the drawings (FIGS. 6 to 12). Circularly arranged on a base plate 8 are a number of jaw segments 9, 10, e.g., 12 segments, capable of radial sliding movement. At their radially outer ends they are formed with locating rims 11 within which all ring segments 5 of a ring are arranged circumferentially one next to the other. At their radially inner ends the jaw segments have upstanding legs 12 presenting angled slide faces 13 which are uniformly urged radially inwards by cooperating with the tapered inner face 14 of a clamping ring 15. This arrangement serves to clamp all the ring segments 5 at their ends nearer the base plate to form a ring. The same function is served also by a cover plate 16, the tapered inner face 21 (FIG. 8) of which also tightens the ring at its upper end, and thus completely. Tension comes from the force of the clamping ring and the cover plate bearing down on the base plate as a result of their weight and, chiefly, from springs 17, 18 which are preloaded by nuts. This makes the proper functioning of the fixture independent of its position.

With this fixture, however, the joints between the plate segments 5 cannot be welded over this entire length because they are partially covered by the locating rims and the outer rim of the cover plate. This disadvantage is eliminated by incorporating slots 20 and 19 in the locating rims and in the rim of the cover plate, respectively (FIGS. 8, 10 to 12).

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A method of fabricating self-supporting rings of a particular diameter by welding together separate segments, comprising the steps of:
   a. making segments of a size including an allowance for shrinkage so that when the segments are assembled they form a complete ring having a diameter larger than the particular diameter,
   b. arranging the individual segments into the shape of a ring within a fixture and without first bonding together any of the segments, the successive segments of the ring being in abutting relationship and the ring being supported only by the fixture,
   c. placing the ring and fixture into a vacuum chamber,
   d. joining the segments to one another by welding their abutting surfaces together, using an electron beam, without removing the ring from the vacuum chamber until all the segments have been welded,
   e. urging all the segments of the ring radially inwardly during the welding operation, and
   f. separating the ring from the fixture.

2. A method as defined in claim 1 wherein the segments are joined in two stages, the first stage being a tack welding of the joint between each two successive segments, and the second stage being a complete welding of the joint between each two successive segments.

3. A method as defined in claim 2 wherein the tack welding is effected by tack welding one joint between segments, then rotating the ring to bring the next successive joint into alignment with the welding beam.

4. A method as defined in claim 2 wherein the second stage complete welding is effected by completely welding one joint between segments, then rotating the assembled ring through substantially 180° to bring a joint diametrically opposite the just-welded joint into alignment with the welding beam after which the beam is moved over said opposite joint to completely weld it, following which the ring is moved through successive rotations of substantially 180°, each such rotation being followed by a complete welding of one of the joints between segments, until all the joints have been welded.

5. A method as defined in claim 1 wherein the shifting of the welding beam from one weld joint to another is effected by rotating the assembled ring.

6. A method as defined in claim 1 wherein each segment includes a plate, the plates are placed in edge-to-edge relationship when the segments are arranged in the shape of a ring, and the abutting edges of the successive rings are welded together.

7. A method as defined in claim 6 wherein each segment includes a single vane projecting from one face of the plate.

* * * * *